United States Patent [19]

Martin et al.

[11] Patent Number: 4,998,323
[45] Date of Patent: Mar. 12, 1991

[54] POULTRY BREAST AND BACK SKINNER

[75] Inventors: Eugene Martin, Ephrata; Harold Martin, Lancaster; Michael E. Lease, Kinzers, all of Pa.

[73] Assignee: Foodcraft Equipment Co., Lancaster, Pa.

[21] Appl. No.: 472,049

[22] Filed: Jan. 30, 1990

[51] Int. Cl.⁵ ............................................. A22B 5/16
[52] U.S. Cl. ...................................... 452/125; 452/71
[58] Field of Search ..................... 17/21, 11, 62, 50

[56] References Cited

U.S. PATENT DOCUMENTS

| | | | |
|---|---|---|---|
| 2,620,510 | 12/1952 | Darrow et al. | 17/21 |
| 3,452,105 | 12/1970 | Townsend | 17/21 |
| 4,292,710 | 10/1961 | Townsend | 17/21 |
| 4,296,526 | 10/1981 | Tournier | 17/21 |
| 4,338,704 | 7/1982 | Welton et al. | 17/21 |
| 4,378,613 | 4/1983 | Crouch | 17/21 |
| 4,466,344 | 8/1984 | Schill | 17/21 |
| 4,723,339 | 2/1988 | van de Nieuwelaar et al. | 17/50 |
| 4,730,368 | 3/1988 | Townsend | 17/21 |
| 4,799,292 | 1/1989 | Harben, III | 17/21 |
| 4,811,459 | 3/1989 | Townsend | 17/21 |
| 4,918,788 | 4/1990 | Passchier | 17/21 |

Primary Examiner—Wilis Little

[57] ABSTRACT

A poultry skinner comprises a stationary frame having a pair of chain guides attached thereto, and a pair of parallel endless chains mounted for movement upon the chain guides. The chains, driven by a motor through a Geneva drive transmission, which produces intermittent motion, carry a series of birds over a first peeling roll for removing skin from the breasts, and, after the bird is inverted, over a second peeling roll which removes the skin from the back. The bird is then automatically engaged by a fixture which supports it for further processing.

Also disclosed is an improved stripper roll arrangement for cleaning peeling rolls, and a skin nicking device for cutting tendons critical to the skinning operation.

12 Claims, 6 Drawing Sheets

POULTRY BREAST AND BACK SKINNER

BACKGROUND

1. Field of the Invention

This invention relates to the art of butchering, and more particularly to an apparatus for skinning chicken breasts and backs.

2. Description of the Prior Art

There are numerous automatic skinning machines. The disclosures in U.S. Pat. Nos. 4,811,459, No. 3,542,105, No. 4,368,613, No. 2,620,510, No. 4,466,344, No. 4,338,704, No. 4,292,710 and No. 4,730,368, for example, are generally pertinent to the present invention. As with the present invention, the devices shown in the above patents operate on the principle of grabbing an edge or corner of the skin, and then pulling or peeling it away from the underlying meat, in a continuous motion. The grasping and pulling is typically performed by one or two cylindrical rolls having sharp teeth designed to bite into and snag an exposed portion of the skin and then pull it around the roll, while the meat itself is prevented from following that path. It is known to provide cleaning or stripping rolls, in addition, to clear the peeling roll(s) of accumulated materials. Skinners are dangerous devices, so it is important to enable such machines to operate with minimal human intervention.

Two problems continue to occur. One is the fouling of the peeling roll teeth, and the stripper roll teeth, with pieces of skin or fat, over a period of time. This not only requires maintenance time to correct, but also affects the quality of the removed skin, whose value for subsequent processes is reduced by the present of water or emulsified materials.

The other problem is the inability of present machines to peel both sides (front and back) of a given piece of meat, such as a the upper half of a chicken. ("Upper half" is a term of art denoting a portion of a chicken which has been plucked and eviscerated, from which the head, neck, legs and thighs have been removed. The upper half thus comprises the ribcage, with breasts, back and wings attached.)

SUMMARY OF THE INVENTION

An object of this invention is to prevent skin and fat from building up on the teeth of a peeling roll.

Another object is to skin a piece of meat on two opposed sides automatically and without human intervention.

These and other objects of the invention are satisfied by a skinner apparatus comprising a stationary frame having a pair of chain guides attached thereto, and a pair of parallel endless chains mounted for movement upon the chain guides. The chains, driven by a motor through a Geneva drive transmission, which produces intermittent motion, carry a series of chicken upper halves over a first skinner for removing skin from the breasts, and, after the bird is reoriented, over a second skinner which removes the skin from the back.

Another aspect of the invention is the orientation of it stripper rolls, which produce markedly improved cleaning of the peeler rolls.

A further aspect of the invention is a nicking device provided at the inlet to the apparatus, which severs underwing tendons that otherwise would interfere with the skinning process.

BRIEF DESCRIPTION OF THE DRAWINGS

In the accompanying drawings.

DESCRIPTION OF THE PREFERRED EMBODIMENT

Figure 1:
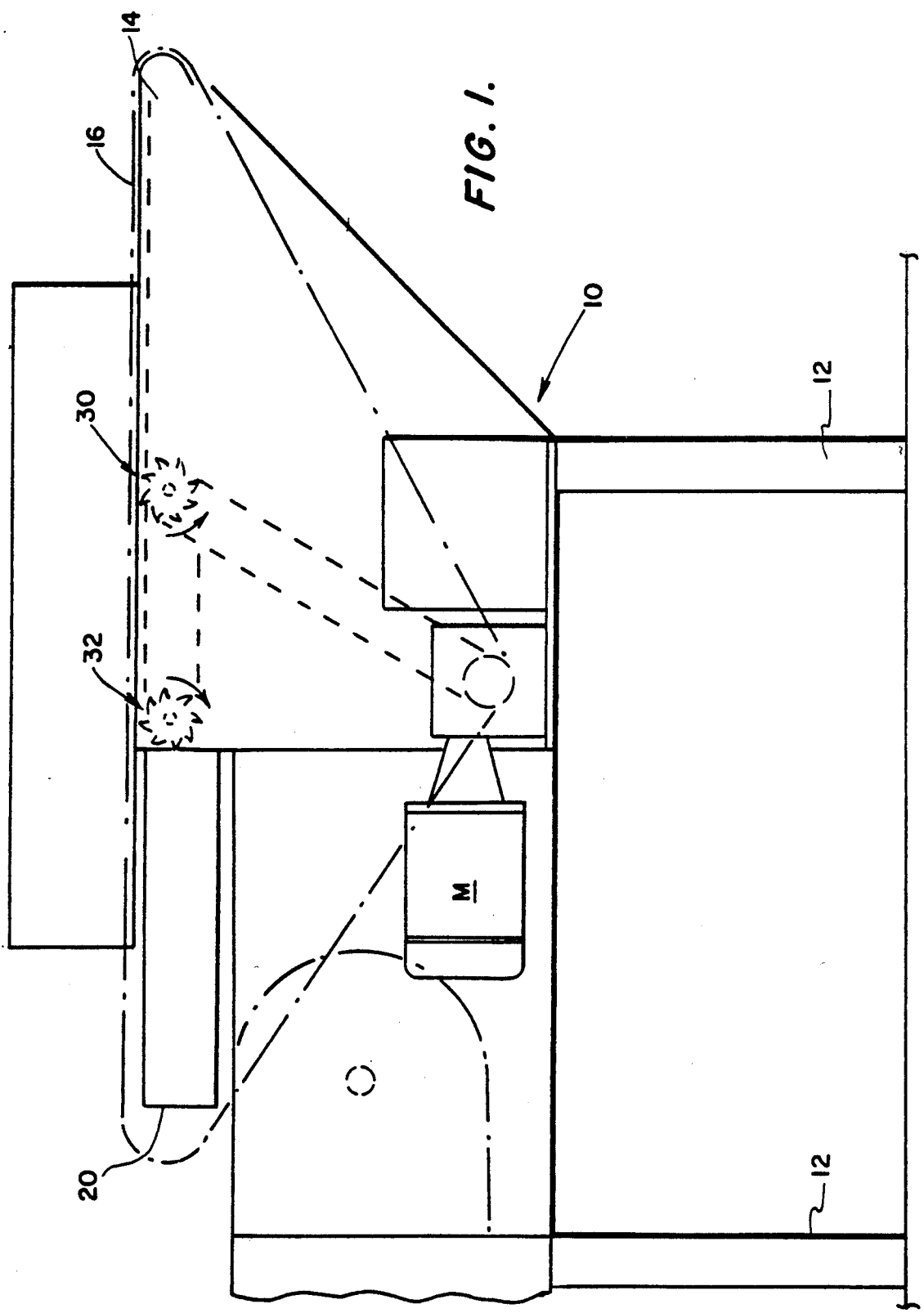
FIG. 1 is a diagrammatic left side elevation of an apparatus embodying the invention.
Figure 2:
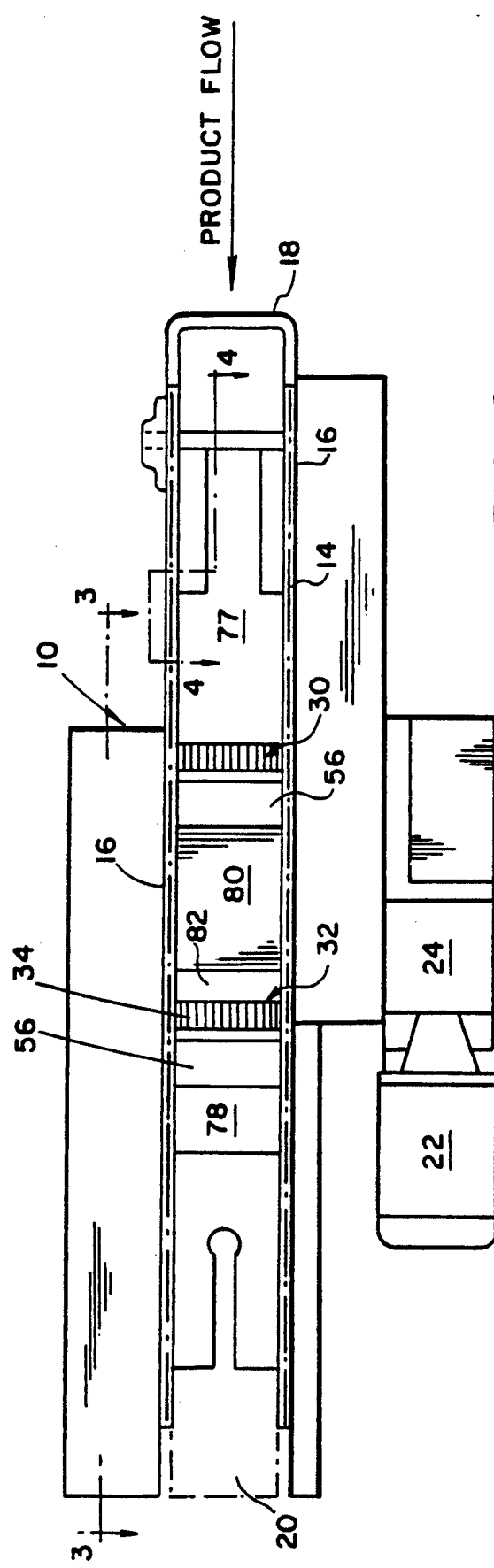
FIG. 2 is a top view thereof.

With reference to FIGS. 1 and 2, an apparatus embodying the invention comprises a stationary frame 10 supported on a plant floor by legs 12. Attached to the frame are a pair of spaced, vertical polymeric guide plates 14 defining a conveying path, and supporting a pair of parallel conveying chains 16, which are shown diagrammatically in these views by broken lines. The chains run on the edges of the guide plates in the direction indicated by the arrows; the upstream and downstream ends of the apparatus are designated by the numerals 18 and 20, respectively, and product flow is in the direction indicated. At the inlet end of the device is a loading station for bird halves.

The conveying chains are driven around the guide plates by a take off chain connected to an idler sprocket on a neighboring machine, having a modified Geneva drive the converts continuous motion of the motor to intermittent motion at the chain. This intermittent motion is characterized by regularly repeating cycles of chain movement of a predetermined stroke length (presently sixteen and a half inches), followed by a motionless dwell period. The drive unit comprises an input shaft 22 having a radially extending bar 24 with a channel 25 therein, and an output shaft 26 parallel to, but vertically offset from, the input shaft. An arm 27 extending radially from the output shaft has a roller 28 at its end, the roller being received in the channel. The output shaft 26 supports a pair of sprockets 29, shown diagrammatically, upon which the respective chains 16 are entrained.

All elements of the machine, including the chains and gearing, are made of USDA approved materials, such as stainless steel and ultra-high molecular weight polyethylene (UHMW).

Figure 5:
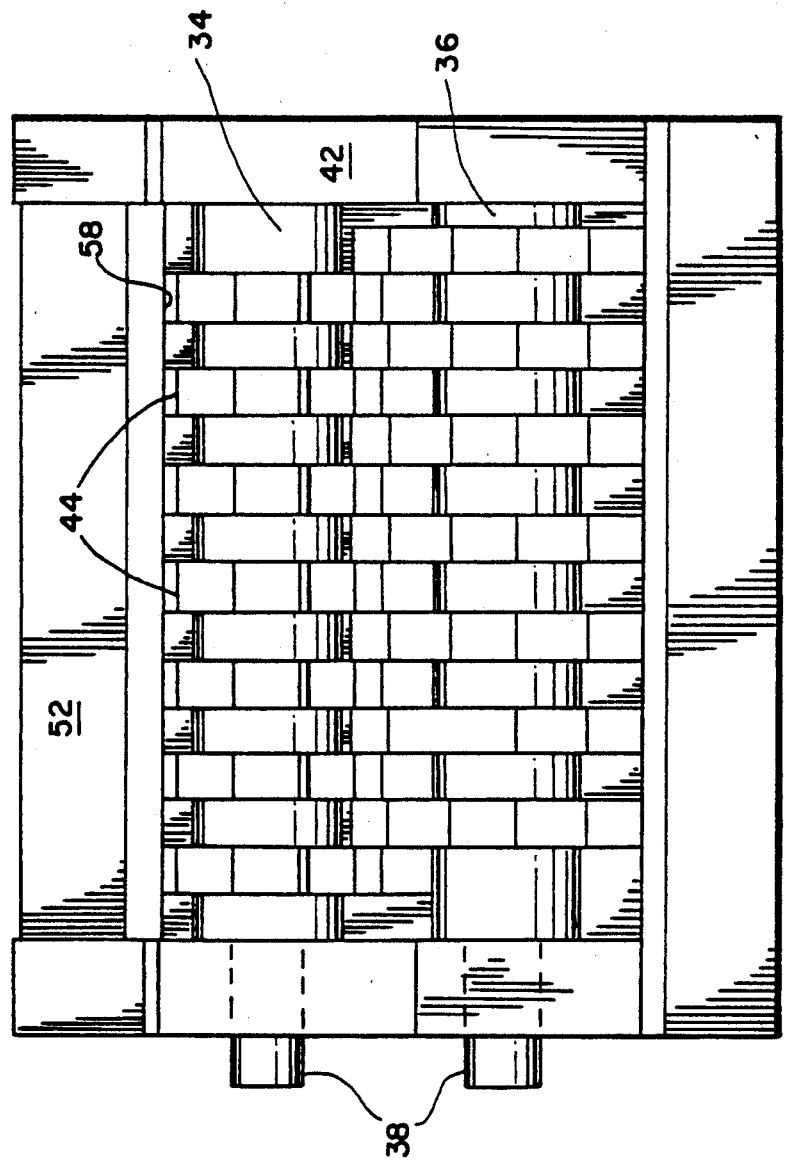
FIG. 5 is an oblique top view of a peeling roll assembly shown in FIG. 3.

The chains have generally flat and horizontal upper runs, passing closely above a pair of skinner units 30 and 32, as shown in FIGS. 1, 2 and 5.

Each skinner unit, one of which is illustrated in FIG. 5, comprises a peeling roll 34 and a stripping roll 36, each supported on a shaft 38 extending through bearings (not shown) mounted on the side plates 42 of the assembly. Each roll comprises a toothed cylinder having a number of equally spaced circumferential reliefs milled in its surface. Each of the toothed blades 44 remaining between the reliefs resembles a thick circular saw blade, having generally triangular pointed teeth 46, best seen in FIG. 3. The spacing between blades is equal to the blade thickness. The leading surface 48 extends along an approximately radial plane, that is, a plane containing radii of the cylinder. The trailing surface 50 of each tooth faces obliquely outward, as shown. The shafts of the two rolls are continuously rotated in the same direction by sprockets (not shown) engaging a common drive chain powered by a motor on the side of the machine opposite the Geneva drive.

We have found that it is best not to use meshing peeler and stripper rolls, as certain spots on the back skinner, as this skinner is subject to fouling from small tendons in the wing area. Therefore, the stripper roll in the back skinner only extends only over the central portion of the roll, corresponding to the middle of the bird body; the outer ends of the stripper roll are completely toothless, and the peeling roll has correspondingly wide outboard teeth. This avoids the tendon fouling problem.

An important feature of the invention is that although the skinner and stripper rolls in a given unit turn in the same direction, they are assembled with their teeth facing in opposite directions; that is, the teeth of the peeling roll face arranged with their steeper (or radial) faces facing the direction of motion, and the teeth of the stripper roll face away from their direction of motion. This has been found to produce markedly better stripping action than the conventional arrangement, in which all teeth face in their direction of motion.

Figure 3:
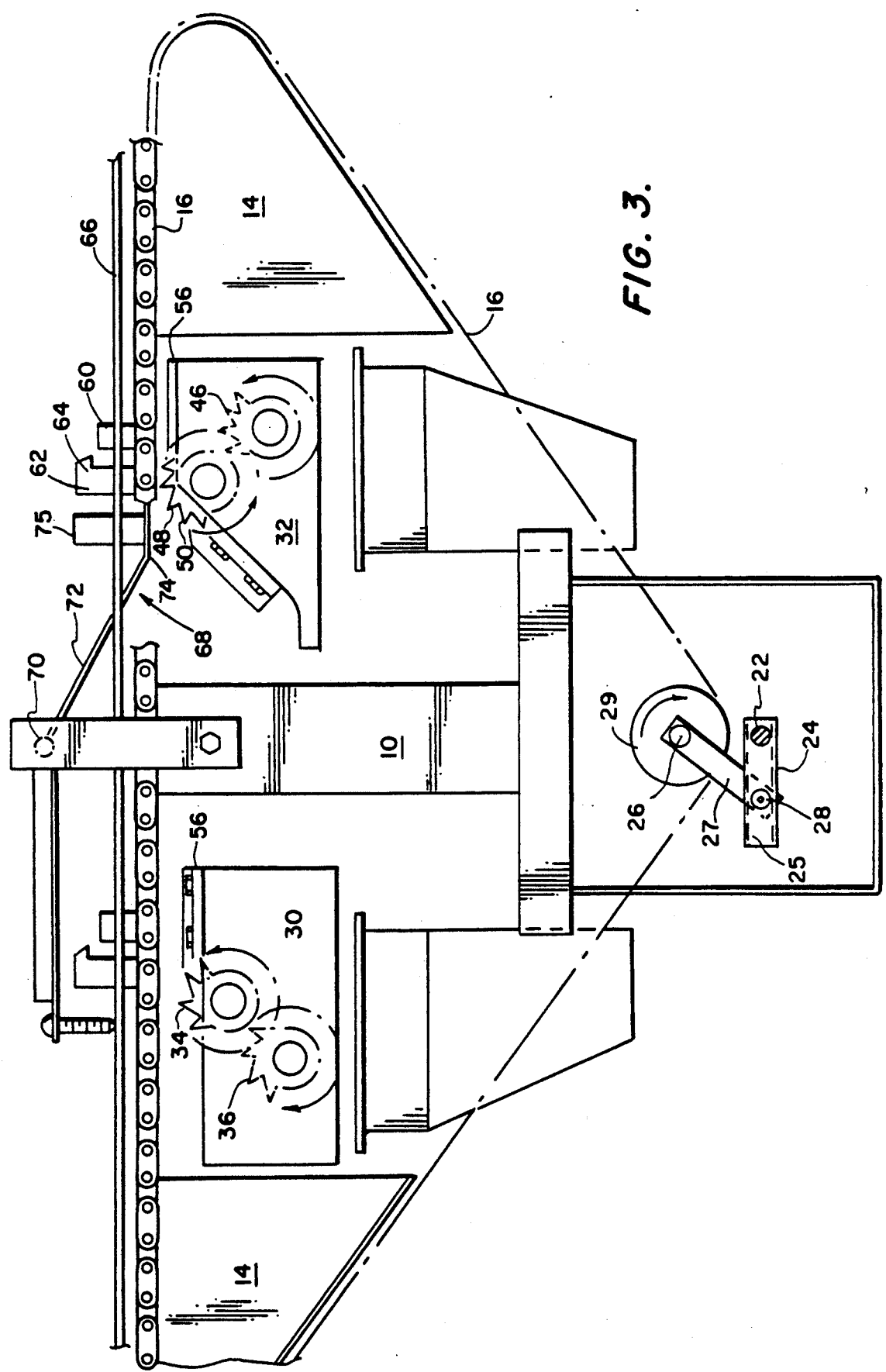
FIG. 3 is a detailed right side elevation of a portion of the apparatus, taken along the line 3—3 in FIG. 2.

FIGS. 3 and 5 also show a shear plate 52, affixed across the side plates 42 of one roll assembly. This plate has a sharp leading edge 54, which helps separate the skin from the breast, and prohibits the breast meat from following the skin as the latter is peeled off by the peeling roll teeth. The peeler roll also has a cleaning combing 56 extending from a plate 58 bolted to the unit.

Figure 4:
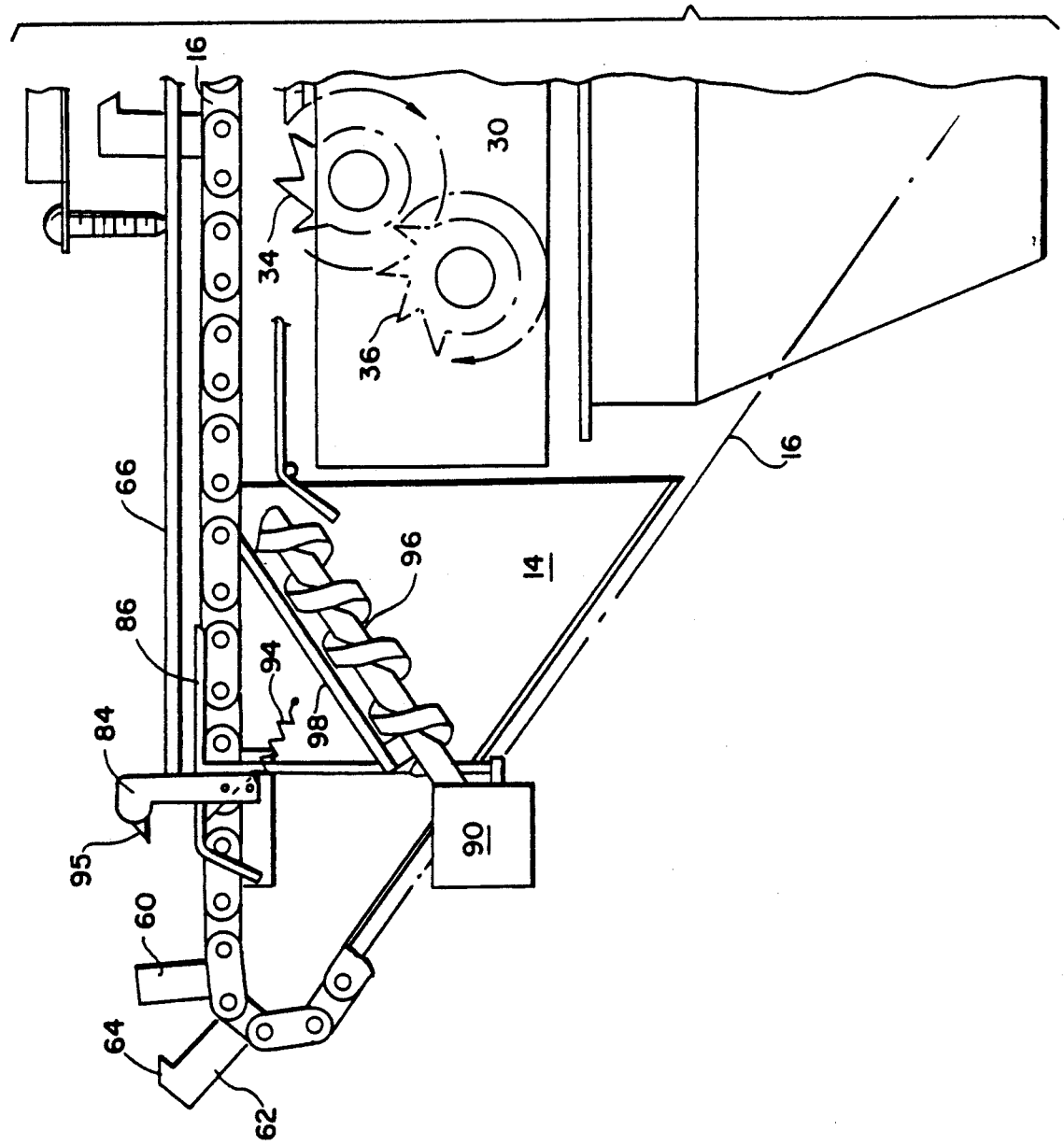
FIG. 4 is an enlarged right side elevation, taken along the line 4—4 in FIG. 2.

Details of the conveyor chains 16 are visible in FIGS. 3–4. Each chain is provided, at intervals corresponding to the stroke produced by the Geneva drive, with pairs of closely spaced tabs 60, 62 extending in a vertical plane, outwardly from the path of the chain. The rearward tab 62 of each pair is preferably a bit longer than its neighbor 60, and has a hook 64 on its leading edge, making for a more positive engagement of the bird wings.

Beginning a short distance downstream from the loading station, a retaining rail 66 overlies each of the chains. The retaining rails close off the space between the chain tabs 60, 62, so that the wings, which support the upper half of each chicken, cannot escape.

A pressure plate 68 (FIG. 3) is positioned above the back skinner 32, to force the back against the teeth of the peeler roll and ensure proper engagement. The pressure plate is pivotally suspended from a horizontal shaft 70 disposed above the conveyor and upstream of the back skinner, and comprises a diagonal portion 72, hinged at its upper end to the pivot shaft, and a generally horizontal portion 74 right above the skinner teeth. A cylindrical weight 75 is welded to the upper surface of the horizontal portion, to provide adequate downward bias. The plate has a range of motion sufficient to permit birds of different sizes to pass beneath it. Above the breast skinner 30, instead of a pressure plate, we prefer to mount a simple rubber finger 76 on a fixed bracket above the breast peeling roll, and pointing downwardly at the roll. Its effect is similar to that of the pressure plate.

At the inlet and outlet ends of the apparatus—that is, upstream of the first skinner and downstream of the second skinner—stationary, but adjustable, horizontal plates 77 and 78 respectively (FIG. 2) are provided to support the body of the bird. Between the two skinners, however there is no comparable surface, but rather a gap 80, which permits the body, now suspended only by its wings, to be inverted. To assist in this reorientation, there is an turning bar 82 positioned ahead of the second skinner unit, which causes the body to follow the wings, and thus assume a breast-up orientation as it is introduced to that unit.

Figure 6:
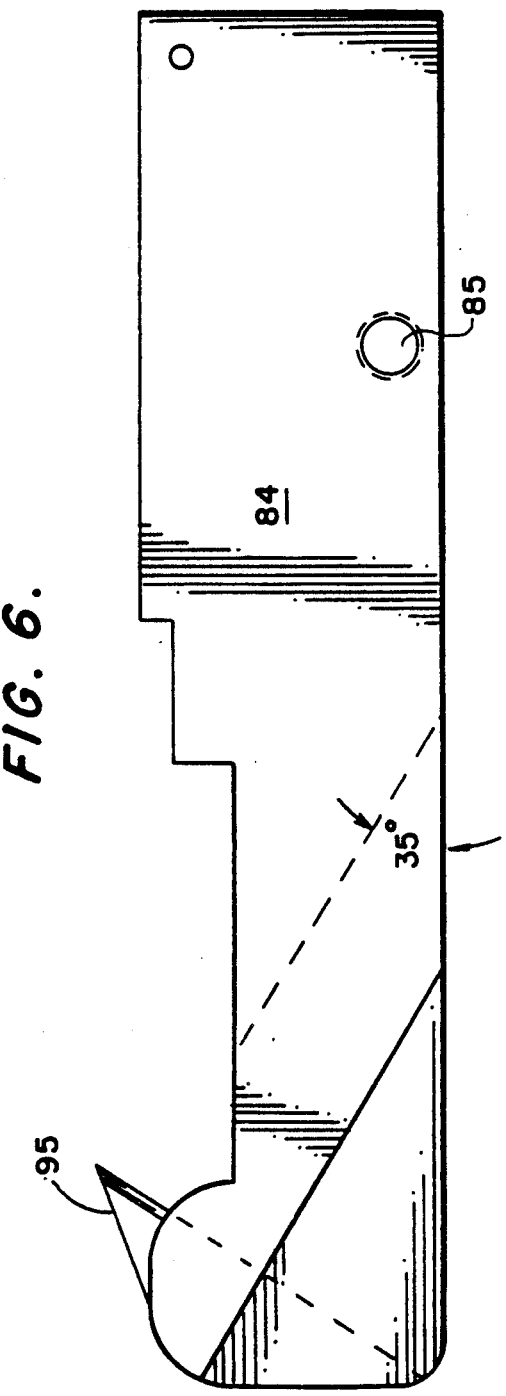
FIGS. 6 and 7 are side and front elevations of portions of a wing nicking device shown in FIG. 4.
Figure 7:
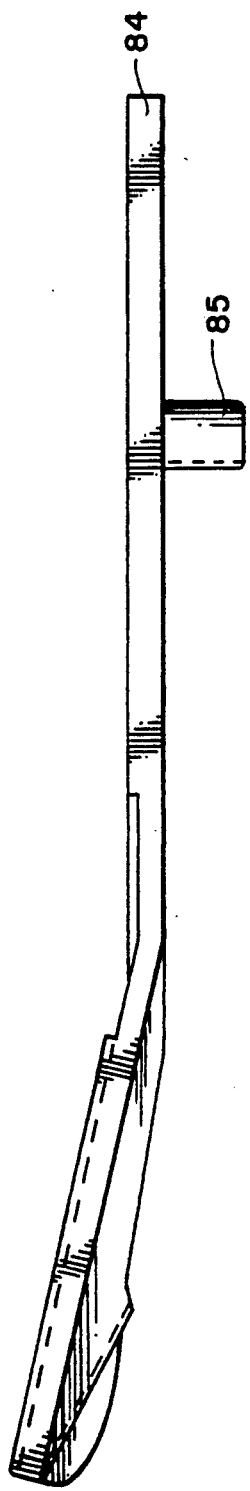

We further provide the apparatus with a nicking device at the upstream end, in order to sever underwing tendons that tend otherwise to retain skin on the breasts. This device, shown in FIG. 4, comprises a pair of arms 84 pivotally mounted via studs 85 on respective brackets 86 on opposite sides of the product path. The pivot axes are inclined, in a common vertical plane transverse to the machine, at angles of about 20° from horizontal. One of the arms is shown in detail in FIGS. 6 and 7. The arm 84, formed of sheet metal, is characterized in that its head is bent out of the plane of the main portion of the arm, about 15°, along a bend line that subtends an angle of 35° with the length of the arm.

The brackets 86 are themselves pivotally mounted to the transfer unit 90 described below, which is stationary. The brackets are drawn towards each other by a tension spring (not visible) extending between them just above the transfer unit.

Each arm is free to pivot, around its hinge axis, in the downstream axis, against the bias of a tension spring 94 connected between the apparatus and the lower end of the arm. A stop (not shown) prevents the spring from pulling the arm back past an approximately vertical position, as viewed from the side of the machine.

The head of the arm has recess for a triangular, knife 95 (FIG. 6) pointing toward the upstream end of the machine.

Below and between the pivot arms, there is a 90° transfer unit affixed to the frame, from which a plastic auger 96 extends obliquely upward, in the downstream direction. This auger rotates continuously, being connected by means of a chain drive, not shown, to one of the rolls of the breast skinner. Looking downstream, the auger would be seen to rotate counterclockwise. A fixed rod 98 is connected to the apparatus, parallel to and along the left side of the auger, to keep pieces of product from wedging between the auger and the left guide plate 14.

In operation, birds are loaded into the apparatus in sequence. The body of the bird is oriented neck up, backs downstream, with each wing positioned between a pair of the vertical tabs 60, 62 on the conveyor chains. The tabs are spread as they come around the sprockets, and the loading procedure is further facilitated by the intermittent motion of the conveyor drive, as there is adequate dwell time to enable a worker to place the bird properly, without the distraction of chain motion. As each upper half enters the apparatus, its wings become confined above by retaining rails 66; thence, the product engages the nicking blades, whose arms yield rearwardly as the product proceeds, making a downward cut through the tendons. Now the bottom of the bird contacts the auger, whose conveying speed exceeds that of the chains, and the auger therefore moves the bottom ahead of the wings, so that the body in proper position (breasts down) for the breast skinner. The chains carry the breasts over the first peeling roll, the teeth of which engage and remove the breast skin. The breast meat is prevented from continuing with the skin by the shear plate, while the skin is prevented from traveling around the peeling roll by the stripper roll, which also removes any stray pieces of skin or fat from the skinner teeth, and prevents material from accumulating on either roll.

The upper half of the bird, meanwhile, clears the shear plate and passes over the gap 80 where, now supported only by its wings, it swings downward and rearward so that when it is pulled over the turning bar 82 in front of the second skinner, it assumes a back down orientation. The body then passes over the second skinner unit, whose operation is like that of the first. The fully skinned upper half now leaves the apparatus, and as it does so, it is automatically engaged by a moving cone-shaped fixture 86 that enters into the body cavity, and supports the breast during further processing, such as filleting.

It will be appreciated that the entire skinning process is automatic from the time the bird upper halves are introduced into the machine, and that workers' hands never need come near the teeth of the stripping rolls.

The invention is presently intended primarily for chicken processing, and therefore the foregoing description referred to chickens and birds. The apparatus described and shown could be converted to remove skin from other types of meat, however, and such conversion would be within the skill of the artisan.

The invention is subject to many other variations and modifications, and inasmuch as the foregoing description and the accompanying drawings illustrate but one embodiment, the invention should measured by the claims that follow.

I claim:

1. In an automatic skinner comprising a peeling roll and a stripper roller, each having plural spaced tooth blades, the blades of the two rolls being interleaved, and means for driving the rolls in the same direction, the improvement wherein the teeth of the peeling roll face in their direction of motion, and the teeth of the stripper roll face away from their direction of motion.

2. An automatic skinner comprising
   a stationary frame,
   a pair of parallel chain guide plates attached to said frame,
   a pair of parallel endless chains mounted for movement around a path defined by said chain guides,
   a chain drive motor,
   means connected between said motor and said chains for converting continuous motion of the motor to intermittent motion of the chains,
   a first skinner unit, adjacent said path, for removing skin from one side of a meat product carried by said chains,
   a second skinner unit, adjacent said path and downstream of the first unit, for removing skin from a second side of the same meat product.

3. The invention of claim 2, wherein the motion converting means includes a Geneva drive transmission adapted to produce regularly recurring chain strokes of a predetermined length, with motionless dwell periods between each stroke.

4. The invention of claim 3, wherein the meat product is poultry, and further comprising a series of pairs of tabs connected to said chain at regular intervals equal to said predetermined length, said tabs protruding outwardly from the path of said chain so that each pair of tabs defines a recess for receiving the wings of the upper half of a bird, and further comprising a pair of retaining rails, each extending above and parallel to a respective one of said chains, so as to retain the wings within their respective recesses.

5. The invention of claim 4, further comprising means for inventing the upper half between the first and second skinner units.

6. The invention of claim 5, wherein the inverting means includes an area where the upper half is supported only by its wings, followed by a turning bar disposed below the upper half, in its path.

7. The invention of claim 2, further comprising a pressure plate above each of said skinner units, for forcing said meat product into contact with the skinner unit.

8. The invention of claim 7, wherein each of said pressure plates is pivotally supported by a horizontal shaft fixed above and upstream of its respective skinner unit, and comprises a horizontal portion with a weight affixed thereto.

9. The invention of claim 2, wherein each of said skinner units comprises a peeling roll and a stripper roller, each having plural spaced tooth blades, the blades of the two rolls being interleaved, and means for driving the rolls in the same direction.

10. The invention of claim 9, wherein the teeth of the peeling roll face in their direction of motion, and the teeth of the stripper roll face away from their direction of motion.

11. The invention of claim 2, further comprising means for cutting underwing tendons prior to skin removal.

12. The invention of claim 11, further comprising
    an auger disposed below said chains and between said guide plates, for contacting the bottom of a bird supported at its wings only by the chains, the auger being oriented obliquely upward in the downstream direction, and
    means for rotating said auger at a speed sufficient to produce a conveying action substantially faster than said chain speed, to raise the bottom of the bird ahead of the wings, prior to said first skinner.

* * * * *